US 7,373,791 B1

(12) United States Patent
Leehr

(10) Patent No.: US 7,373,791 B1
(45) Date of Patent: May 20, 2008

(54) METHODS OF FORMING PARTICULATE GLASS BATCH COMPOSITIONS

(75) Inventor: William H. Leehr, Winston-Salem, NC (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/526,772

(22) Filed: Mar. 16, 2000

Related U.S. Application Data

(60) Provisional application No. 60/143,602, filed on Jul. 13, 1999.

(51) Int. Cl.
*C03B 5/00* (2006.01)
(52) U.S. Cl. .................... 65/27; 65/135.1; 65/135.9
(58) Field of Classification Search ............ 65/27, 65/135.9, 135.1, 136.1, 168; 423/210.5
See application file for complete search history.

(56) References Cited

U.S. PATENT DOCUMENTS

| | | | |
|---|---|---|---|
| 3,726,697 A | 4/1973 | Mod et al. | |
| 3,753,743 A | 8/1973 | Kakuda et al. | 106/52 |
| 3,773,633 A | 11/1973 | Teller | 204/67 |
| 3,788,832 A | 1/1974 | Nesbitt et al. | 65/134 |
| 3,789,628 A | 2/1974 | Mahoney | 65/27 |
| 3,808,774 A | 5/1974 | Teller | 55/68 |
| 3,880,629 A | 4/1975 | Dulin et al. | 65/27 |
| 3,880,639 A * | 4/1975 | Bodner et al. | 65/134 |

(Continued)

FOREIGN PATENT DOCUMENTS

CA    2013264    3/1980

(Continued)

OTHER PUBLICATIONS

Abstract for RU 2057727 dated Apr. 1996 in Database WPI, Section Ch, Week 199702 from Derwent Publications Ltd.

(Continued)

*Primary Examiner*—Carlos Lopez
(74) *Attorney, Agent, or Firm*—Dennis Millman

(57) ABSTRACT

The present invention provides method of contemporaneously forming a particulate glass batch composition and reducing volatile components in an exhaust stream, comprising the steps of: (a) introducing an exhaust stream comprising one or more volatile components into a mixing chamber; (b) adding a particulate glass batch precursor composition comprising at least one reagent material that is reactive with at least one of the one or more volatile components of the exhaust stream into the mixing chamber; (c) reacting at least a portion of the particulate glass batch precursor composition with at least a portion of the one or more volatile components of the exhaust stream in the mixing chamber to form a particulate glass batch composition and reduce the amount of the one or more volatile components in the exhaust stream; (d) separating the particulate glass batch composition from the exhaust stream; and (e) venting the exhaust stream having a reduced amount of volatile components to the atmosphere. In one particular embodiment of the invention, the at least one reagent material is selected from the group consisting of alkali earth compounds, alkali metal compounds, aluminum compounds, silicon compounds and mixtures thereof, and the reagent material is added in an amount that is at least five times a stoichiometric molar amount necessary to completely react with the at least one of the one or more volatile components in the mixing chamber.

55 Claims, 1 Drawing Sheet

U.S. PATENT DOCUMENTS

| | | | |
|---|---|---|---|
| 3,919,392 A | 11/1975 | Teller | 423/240 |
| 3,953,190 A | 4/1976 | Lange | 65/335 |
| 3,957,464 A | 5/1976 | Teller | 55/68 |
| 3,969,482 A | 7/1976 | Teller | 423/235 |
| 3,995,005 A | 11/1976 | Teller | 423/210 |
| 4,045,197 A | 8/1977 | Tsai et al. | |
| 4,049,399 A | 9/1977 | Teller | 55/73 |
| 4,099,953 A | 7/1978 | Rondeaux et al. | 65/335 |
| 4,184,861 A | 1/1980 | Erickson et al. | 65/27 |
| 4,208,201 A | 6/1980 | Rueck | 65/27 |
| 4,225,332 A | 9/1980 | Tsay | 65/134 |
| 4,248,615 A | 2/1981 | Seng et al. | 65/27 |
| 4,248,616 A | 2/1981 | Seng et al. | 65/335 |
| 4,282,019 A | 8/1981 | Dunn et al. | 65/27 |
| 4,293,524 A | 10/1981 | Teller et al. | 422/169 |
| 4,298,369 A | 11/1981 | Froberg et al. | 65/27 |
| 4,316,732 A | 2/1982 | Propster et al. | 65/27 |
| 4,319,890 A | 3/1982 | Teller et al. | 55/1 |
| 4,325,922 A | 4/1982 | Bryant | 423/210 |
| 4,328,016 A | 5/1982 | Hohman et al. | 65/2 |
| 4,330,316 A | 5/1982 | Hohman et al. | 65/27 |
| 4,335,660 A | 6/1982 | Maloney et al. | 110/206 |
| 4,337,229 A | 6/1982 | Teller | 423/225 |
| 4,338,112 A | 7/1982 | Propster | 65/27 |
| 4,338,113 A | 7/1982 | Hohman et al. | 65/27 |
| 4,342,730 A | 8/1982 | Perrotta | |
| 4,349,367 A | 9/1982 | Krumwiede | 65/27 |
| 4,350,512 A | 9/1982 | Krumwiede | |
| 4,358,304 A | 11/1982 | Froberg | 65/27 |
| 4,362,543 A | 12/1982 | Froberg | 65/27 |
| 4,375,455 A | 3/1983 | Teller et al. | 423/210 |
| 4,378,987 A | 4/1983 | Miller et al. | |
| 4,478,627 A | 10/1984 | Hohman et al. | 65/27 |
| 4,519,814 A | 5/1985 | Demarest, Jr. | 65/27 |
| 4,525,142 A | 6/1985 | Gleason et al. | 423/235 |
| 4,539,030 A | 9/1985 | Demarest, Jr. et al. | 65/27 |
| 4,559,211 A | 12/1985 | Feldman et al. | 423/242 |
| 4,561,873 A * | 12/1985 | Hempel et al. | 65/27 |
| 4,581,210 A | 4/1986 | Teller | 423/242 |
| 4,604,121 A | 8/1986 | Demarest, Jr. et al. | 65/27 |
| 4,652,289 A * | 3/1987 | Drouet et al. | 65/27 |
| 4,696,691 A | 9/1987 | Lawhon et al. | 65/27 |
| 4,726,830 A | 2/1988 | Hughes et al. | 65/27 |
| 4,940,478 A | 7/1990 | Naber et al. | 65/27 |
| 4,944,785 A | 7/1990 | Sorg et al. | 65/136 |
| 4,985,219 A | 1/1991 | Helfritch et al. | 423/235 |
| 5,147,516 A | 9/1992 | Mathur et al. | |
| 5,165,902 A | 11/1992 | Bortz et al. | 423/235 |
| 5,213,780 A | 5/1993 | Helfritch | 423/239 |
| 5,240,575 A | 8/1993 | Mathur et al. | |
| 5,290,334 A | 3/1994 | Alexander | 65/335 |
| 5,399,181 A | 3/1995 | Sorg | 65/27 |
| 5,713,977 A * | 2/1998 | Kobayashi | 65/134.6 |
| 5,848,960 A | 12/1998 | Mechtersheimer et al. | 588/252 |
| 5,893,940 A | 4/1999 | Tsai | 65/29.19 |

FOREIGN PATENT DOCUMENTS

| | | |
|---|---|---|
| JP | 58-74183 | 5/1983 |
| WO | WO 94/06563 | 3/1994 |

OTHER PUBLICATIONS

European Search Report, Application No. EP 05001174, dated Apr. 13, 2006, 3 pages.
Office Action from the Patent Office of the People's Republic of China issued Feb. 9, 2007 for Application No. 00811069.7.
Notice of Allowance from the Canadian Intellectual Property Office dated Jun. 1, 2006 for Application No. 2.379,202.
Translation of Preliminary Notice of Rejection of the IPO issued Jun. 6, 2005 for Application No. 089112944.
Decision to Grant from the European Patent Office dated Jul. 18, 2005 for Application No. 00944993.5.
Translation of Preliminary Notice of Rejection of the IPO issued May 7, 2004 for Application No. 089112944.
Translation of Preliminary Notice of Rejection of the IPO issued Nov. 20, 2003 for Application No. 089112944.
Translation of Decision of the Intellectual Property Office issued Jul. 12, 2002 for Application No. 089112944.
*The Manufacturing Technology of Continuous Glass Fibres*, by K. L. Loewenstein (3rd Ed 1993) pp. 47-81.
*The Manufacturing Technology of Continuous Glass Fibres*, by K. L. Loewenstein (3rd Ed 1993) pp. 36-44.
*Ceramic Industry*, "Glass Manufacturing Technology, Industry and Government Partnership Fuels Glass Industry", by Laurel M. Sheppard, Mar. 1997.
Office Action from EPO issued Jun. 24, 2002.
Office Action from the Patent Office of the People's Republic of China, issued Nov. 26, 2004.
Office Action from the Canadian Intellectual Property Office, issued Mar. 10, 2005.
Information Sheet from EPO website regarding CN1045928, published Oct. 10, 1990.
Office Action from EPO, issued Aug. 6, 2003.
Office Action from EPO, issued Dec. 22, 2003.

* cited by examiner

METHODS OF FORMING PARTICULATE GLASS BATCH COMPOSITIONS

CROSS REFERENCE TO RELATED PATENT APPLICATION

This application claims the benefit of U.S. Provisional Application No. 60/143,602, filed Jul. 13, 1999.

FIELD OF THE INVENTION

The present invention relates to methods of contemporaneously forming a particulate glass batch composition and reducing volatile components in an exhaust stream from a glass melting furnace.

BACKGROUND OF THE INVENTION

When glass batch compositions are melted in a glass melting furnace, volatile components can be released from one or more of the glass batch materials. As used herein the terms "glass batch" or "glass batch composition" mean one or more glass batch materials that when melted form a specified glass composition. In particular, when glass batch materials are melted to produce certain types of glass composition, e.g. "E-glass", volatile components, such as boron, fluorine and/or sulfur-containing compounds, are released into the furnace atmosphere. Depending on the temperature and humidity of the atmosphere, these volatile components can form gaseous compounds such as HF, $SO_2$, and $H_3BO_3$ or be condensed to form solid compounds such as $HBO_2$. The loss of such volatile components from the glass batch not only increases batch cost but also creates problems when the exhaust stream is vented to the atmosphere. For example, at high temperatures, these volatile components can form highly corrosive acid gases that become entrained in the exhaust system. As the exhaust stream cools, condensation of corrosive acids and other undesirable particulate materials can occur in the exhaust system causing deterioration of system components, increased maintenance costs, reduced operating efficiencies and emissions control problems. For example, the condensation of gaseous $H_3BO_3$ to form a sticky, solid particulate ($HBO_2$) has been found to clog ductwork and filtering systems and contribute to visible emissions (or opacity) of the vented exhaust stream. While all of these volatile components present certain emissions control issues, of particular concern are the volatilized boron compounds that are difficult to control and recover.

Typically, attempts to reduce or eliminate volatile components from an exhaust stream involve the use of specialized wet or dry scrubbing processes or a combination of both. U.S. Pat. No. 4,208,201 discloses a process wherein dust from a batch house is introduced into an exhaust stream from one or more melting furnaces. The dust particles, which preferably have a diameter of ten microns or more, form nuclei upon which condensables in the exhaust will condense (col. 2, lines 38-44). After mixing with the exhaust, the dust particles are filtered from the exhaust stream and returned to the batch source and reused (col. 2, lines 67-68 and col. 3, lines 1-2). U.S. Pat. Nos. 3,995,005 and 3,969,482 disclose methods of treating flue gas from a melting furnace using a two-stage process comprising a first step of quenching the flue gas with an alkaline solution or slurry of basic material to form a salt and a second step of contacting the flue gases with a particulate sorbant material to remove residual acid gas. Preferably, the temperature of the flue gas ranges from about 200° F. to about 300° F. (about 93° C. to about 149° C.) immediately prior to mixing with the sorbant material. Additionally, it is preferred that the concentration of residual acid gas in the flue gas is reduced to less than about 500 parts per million prior to mixing with the sorbant material since the sorption process is generally not economical to employ at higher concentrations (col. 7, lines 33-38 of U.S. Pat. No. 3,969,482). It is also preferred that the temperature of the gas stream introduced into the bag house be below about 185° F. (about 85° C.) to minimize the volatility of the boric acid deposited in the bag filter.

Such two step processes are complex, expensive and can be difficult to operate and maintain. Additionally, it has been observed that the recovery of boron compounds by condensation, such as by the introduction of flue gas containing volatile boric acid species into bag filters at temperatures less than about 190° F. (about 88° C.), can lead to clogging of ductwork and bag-blinding due to the deposition of sticky boric acid condensates thereon. As used herein the term "bag-blinding" means that the filter bag becomes coated or clogged such that airflow through the bag is severely restricted. Furthermore, little or no recovery of energy from the flue gas is achieved in such a system.

Other patents have been directed toward the recovery of energy, particulate materials and volatiles from a flue or exhaust gas stream of a melting furnace by passing the exhaust stream through a bed or column of pelletized batch materials. U.S. Pat. No. 3,953,190 discloses a preheater and recycling structure having a glass batch pellet containing intermediate section through which hot exhaust gas is passed. As the exhaust gas passes through the structure, the pellets are heated and the gas stream is cooled to permit the condensation of volatile materials and dust therein (col. 3, lines 31-35). The temperature of the gas entering the structure ranges from about 1000° F. to about 1600° F. (about 538° C. to about 871° C.) and is cooled to about 600° F. (about 316°) upon passing through the structure and is vented at a temperature of about 450° F. (col. 4, lines 6-13). The preheated pellets are subsequently fed into the melting furnace. U.S. Pat. No. 4,248,615 discloses a process for recovering energy and abating pollution in a glass manufacturing process, wherein flue gas from a melting furnace is directed into a preheater containing agglomerated batch materials to heat the agglomerates prior to their introduction into the furnace. After passing through the preheater, the gas is passed into one or more preconditioning chambers to preheat agglomerated batch materials prior to their introduction into the preheater. Particulates can be separated out of the flue gas due to the "filter-type" action of the agglomerates (col. 6, lines 7-8). Additionally, some gaseous polluting species can be recovered due to condensation as the temperature of the flue gas is decreased (col. 6, lines 11-15).

While such methods and apparatus are convenient for use with pelletized batch materials, they tend to be inefficient in recovering volatiles due to the low active surface area associated with agglomerated or pelletized materials, and are not well suited for use with particulate batch materials due to difficulties associated with passing an exhaust stream through a bed of particulate material. For example, passing a hot exhaust stream through a bed of non-agglomerated, particulate materials can result in the generation of dust and the loss of fine particles, as well as the formation of aggregates and high system pressure drops. Particulate glass batch materials also tend to be difficult to fluidize due to their fine particle size.

U.S. Pat. Nos. 4,298,369 and 4,282,019 disclose systems for preheating pelletized batch materials with flue gases while improving the removal of volatile species from the flue gas. U.S. Pat. No. 4,298,369 discloses a glass manufacturing process, wherein a particulate boron and/or fluorine reactive material is introduced into and reacted with a flue gas stream at a temperature in excess of about 500° C. (about 932° F.) (col. 2, lines 1-8). Preferably, the reactive material is added to the flue gas, on an oxide basis, at such a rate that a weight ratio of the oxide to the total boron and/or fluorine flowing in the gases coming from the recuperator will be at least 4 and more typically 5-10 times that ratio (col. 5, lines 17-24). The flue gas is then passed through a slag box to remove large particles and then through a bed of pelletized batch material to preheat the pelletized batch material, preferably to a temperature of about 500° C. (about 932° F.). U.S. Pat. No. 4,282,019 discloses a process of calcining colemanite, abating pollution and preheating pelletized batch materials, wherein raw colemanite is introduced into a flue gas stream at a temperature in excess of about 500° C. (about 932° F.) to decrepitate and react the colemanite with volatile boron and/or fluorine in the gas. The gas and colemanite are then passed through a cyclone separator to separate and recover the colemanite. After separation the gas is passed through a pellet preheater. Preferably, the temperature of the gas passing through the pellet preheater will be in excess of 500° C. (about 932° F.) (col. 3, lines 58-63).

Again, processes are not well suited for use in systems wherein non-pelletized batch materials are fed into a melting furnace due to difficulties associated with passing an exhaust stream through a bed of particulate materials (as discussed above).

Attempts have been made to preheat particulate materials using exhaust gas. U.S. Pat. No. 4,099,953 discloses the use of a fluidized bed preheater to preheat starting material for a glass batch composition. Exhaust gas is passed from a melting furnace into a fluidized bed to preheat the starting materials contained therein. A high performance filter is used to collect fine particles entrained in the residual gases of the fluidized bed preheater. U.S. Pat. No. 4,349,367 discloses a method of recovering waste heat using a granular heat exchange medium, wherein exhaust gas is passed through a first bed of granular material to recover heat therefrom. The heated granular medium is then passed into a second bed where it is used to preheat combustion air. Particulates in the exhaust stream can be recovered by the granular heat exchange medium of the first bed or they can be filtered prior to passage through the first bed by contact with a bed of cullet material. The cullet material can then be passed into the melting furnace. However, neither of these patents address the recovery of volatile contaminates from the exhaust stream.

Accordingly, there is a need for an effective method of reducing and reclaiming a variety of volatile components, particularly volatile boron compounds, from an exhaust stream that can be used in conjunction with a particulate batch feeding system and that provides for reduced system complexity, reduced batch costs, increased utilization of energy and improved bag house operations.

SUMMARY OF THE INVENTION

The present invention provides a method of contemporaneously forming a particulate glass batch composition and reducing volatile components in an exhaust stream, comprising the steps of: (a) introducing an exhaust stream comprising one or more volatile components into a mixing chamber; (b) adding a particulate glass batch precursor composition comprising at least one reagent material that is reactive with at least one of the one or more volatile components of the exhaust stream into the mixing chamber; (c) reacting at least a portion of the particulate glass batch precursor composition with at least a portion of the one or more volatile components of the exhaust stream in the mixing chamber to form a particulate glass batch composition and reduce the amount of the one or more volatile components in the exhaust stream; (d) separating the particulate glass batch composition from the exhaust stream; and (e) venting the exhaust stream having a reduced amount of volatile components to the atmosphere. In one particular embodiment of the invention, the at least one reagent material is selected from the group consisting of alkali earth compounds, alkali metal compounds, aluminum compounds, silicon compounds and mixtures thereof, and the reagent material is added in an amount that is at least five times a stoichiometric molar amount necessary to completely react with the at least one of the one or more volatile components in the mixing chamber.

The present invention also provides a method of contemporaneously forming a particulate glass batch composition and reducing an amount of one or more volatile components in an exhaust stream comprising the steps of: (a) introducing an exhaust stream comprising one or more volatile components into a mixing chamber at a temperature of up to about 1400° F. (about 760° C.); (b) injecting a particulate glass batch precursor composition comprising at least one reagent material reactive with at least one of the one or more volatile components of the exhaust stream and air into the mixing chamber, wherein the particulate glass batch precursor composition is deficient in the at least one of the one or more volatile components of the exhaust stream with which the reagent material is reactive; and (c) reacting at least a portion of the particulate glass batch precursor composition with at least a portion of the one or more volatile components of the exhaust stream in the mixing chamber to form a particulate glass batch composition and reduce the amount of the one or more volatile components in the exhaust stream.

The present invention further provides a method of contemporaneously forming a particulate glass batch composition and reducing an amount of one or more volatile components in an exhaust stream comprising the steps of: (a) introducing an exhaust stream comprising one or more volatile components into a mixing chamber; (b) injecting a reagent material reactive with the volatile components of the exhaust stream into the mixing chamber; (c) reacting at least a portion of the reagent material with at least a portion of the one or more volatile components of the exhaust stream in the mixing chamber to form a particulate glass batch material and reduce the amount of the one or more volatile components in the exhaust stream; (d) separating the particulate glass batch forming material from the exhaust stream; and (e) mixing the particulate glass batch material with other particulate glass batch forming materials to form a glass batch composition.

BRIEF DESCRIPTION OF THE DRAWING

The foregoing summary and the following detailed description of the preferred embodiments will be better understood when read in conjunction with the appended drawing.

DETAILED DESCRIPTION OF THE PREFERRED EMBODIMENTS

Figure 1:
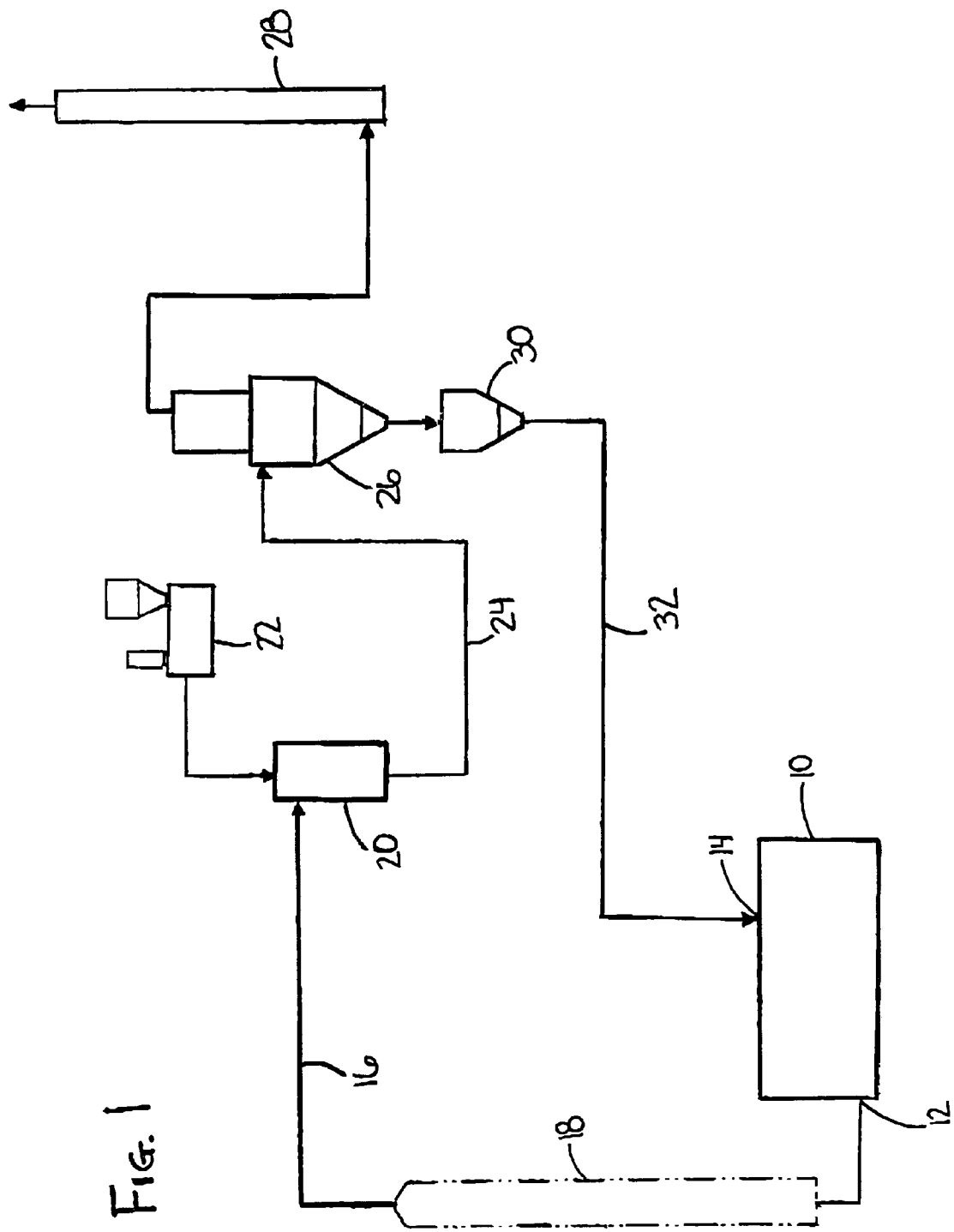
FIG. 1 is a schematic flow diagram illustrating one embodiment of a process according the present invention.

The present invention provides cost efficient methods of forming a glass batch composition from a particulate glass batch precursor composition while reducing volatile components in an exhaust stream and subsequently feeding glass batch composition into a glass melting furnace. Advantages of methods of the present invention include, but are not limited to: reduced stack emissions, improved recovery of volatile boron compounds, reduced batch costs, increased utilization of energy, improved bag-house operation and reduced system complexity. Additionally, the methods of the present invention are particularly well suited for use with oxygen-fuel fired melting furnaces (discussed below).

The methods of the present invention are suitable for use in a variety of glass manufacturing operations including but not limited to: continuous glass fiber manufacturing operations, float glass manufacturing operations, fiber glass insulation manufacturing operations and other glass manufacturing operation involving boron-containing glass compositions that are well known to those skilled in the art.

Referring now to FIG. 1, there is shown a glass melting furnace 10 having one or more exhaust outlets 12 and one or more glass batch inlets 14. The glass melting furnace 10 can be any type of glass melting furnace known in the art, for example, a direct fired furnace. If the glass melting furnace 10 is direct fired furnace, the combustion fuel can be any type known in the art, for example natural gas or fossil fuel. In one particular, non-limiting embodiment of the present invention, the preferred combustion gas used in the direct fired furnace is oxygen (so called "oxy-fuel" furnaces). The use of oxygen as the fuel lowers gas flow requirements, eliminates nitrogen oxide emissions and improves melting efficiencies. However, it will be recognized by one skilled in the art that other combustion gases, such as air, can be used as well.

Although not limiting in the present invention, in one particular embodiment wherein the glass melting furnace is a fiber glass melting furnace, the output of the glass melting furnace is preferably greater than about 1000 pounds per hour (about 455 kilograms per hour), and more preferably greater than about 2000 pounds per hour (about 909 kilograms per hour), although higher output furnaces can be used in accordance with the present invention. For more information on fiber glass melting furnace suitable for use in the present invention, see K. Loewenstein, *The Manufacturing Technology of Continuous Glass Fibers* (3rd. Ed., 1993) at pages 47-81, which is hereby incorporated by reference.

Referring to FIG. 1, an exhaust stream comprising one or more volatile components released from the glass batch forming materials melted in the glass melting furnace 10 is extracted from the glass melting furnace via the one or more exhaust outlets 12 and passes into a conduit 16. The temperature of the exhaust stream exiting the glass melting furnace 10 and the composition of the one or more volatile components in the exhaust stream will depend upon, among other things, the glass batch composition being melted. For example, if an "E-glass" batch composition (discussed below) is melted in glass melting furnace 10, the temperature of the exhaust stream extracted therefrom typically will range from about 2200° F. to about 2500° F. (about 1204° C. to about 1371° C.). Although not meant to be limiting in the present invention, the one or more volatile components released from the glass batch materials during melting can include, boron-containing compounds, fluorine-containing compounds, sulfur-containing compounds, aluminum-containing compounds, silicon-containing compounds and mixtures thereof. It will be further appreciated by those skilled in the art, that the exhaust stream can also comprise volatile components from the combustion gas, that have the potential to be removed from the exhaust stream using the method as disclosed in the present invention, such as but not limited to sulfur dioxide. However, it is expected that the volatile components in the exhaust stream are primarily released from the glass batch forming materials during melting.

Glass batch compositions suitable for use in the present invention include, but are not limited to, compositions for forming fiber glass such as "E-glass" (which is preferred), "A-glass", "C-glass", "D-glass", "R-glass", "S-glass", Basalt-glass and E-glass derivatives that contain up to minor amounts of boron and/or fluorine. As used herein, "minor amount" means less than about 1 weight percent fluorine and less than about 5 weight percent boron. The formulations for these and other glass compositions are well known to those skilled in the art. If more information is needed, see K. Loewenstein, *The Manufacturing Technology of Continuous Glass Fibers* (3rd. Ed. 1993) at pages 30-36, which is hereby incorporated by reference.

Although not required, a recuperator, heat exchanger or other cooling device 18 (shown in phantom) that is well known in the art can be combined with the one or more exhaust outlets 12 of glass melting furnace 10 or conduit 16 to effect faster cooling of the exhaust stream exiting therefrom and recover some of the energy lost as heat in the exhaust. If a cooling device 18 is employed, most preferably the cooling device will not substantially increase the humidity of the exhaust stream as it passes therethrough, i.e. preferably the cooling device 18 will not be a water quenching cooling device since high humidity levels can lead to the condensation of corrosive liquids in the ductwork and the formation of sticky particulate materials (such as $HBO_2$) that tend to clog the ductwork and increase the pressure drop of the system.

Referring to FIG. 1, conduit 16 is connected to a mixing chamber 20. Although not required, mixing chamber 20 is preferably a cyclone-venturi type mixing chamber, wherein the exhaust stream introduced into mixing chamber 20 is delivered in a manner so as to cause the exhaust stream to flow proximate the walls of the chamber 20 creating a vortex into which a particulate glass batch precursor composition (discussed below) can be delivered. However, other types of mixing chambers that permit sufficient intermixing of the exhaust stream and the particulate glass batch precursor composition can also be used in accordance with the present invention.

The desired temperature of the exhaust stream entering the mixing chamber 20 will depend on the composition of the one or more volatile components in the exhaust stream and the reagent material (discussed below) of the particulate glass batch precursor composition with which the volatile component(s) are to be reacted. For example, and not limiting in the present invention, if the exhaust stream entering the mixing chamber contains volatile boron compounds and the reagent material is a calcium carbonate, it is preferred that the temperature of the exhaust stream entering the mixing chamber 20 by not greater than about 800° F. (427° C.), and preferably in the range from about 700° F. to about 800° F. (about 371° C. to about 427° C.) to promote the desired reaction between the boron and the calcium-containing compound. Although not required, the temperature of the exhaust stream entering the mixing chamber 20 is preferably not greater than about 1400° F. (about 760° C.), more preferably no greater than about 900° F. (about 482° C.), and most preferably no greater than about 800° F. (about 427° C.).

The desired temperature drop within the mixing chamber 20 and thus the exhaust stream exit temperature will depend on the desired volatiles to be removed from the exhaust stream and reagent material. More specifically, the temperature in the mixing chamber 20 preferably drops through the temperature range at which the desired volatile will react with the reagent material. For example and without limiting the present invention, in one embodiment the temperature of the exhaust stream within the mixing chamber 20 drops to less than about 400° F. (about 204° C.) and preferably to less than about 220° F. (about 104° C.). This will ensure that the sulfur will react with the reagent material within the mixing chamber 20.

It will be appreciated by one skilled in the art that the efficiency of the removal of the volatile compounds from the exhaust stream depends on how well the reagent reacts with the volatile compounds in the mixing chamber 20. This, in turn, is impacted by the mixing of the exhaust stream and the particulate glass batch precursor composition in the mixing chamber 20, the temperature within the mixing chamber 20 and the amount of time allowed for the reactions to occur. Insufficient inter-mixing between the exhaust stream and the particulate glass batch precursor, reduced residence time in the mixing chamber 20 and temperatures within the chamber 20 that do not provide for optimal reaction conditions can result in reduced removal efficiency.

With continued reference to FIG. 1, a particulate material delivery system 22 is also connected to mixing chamber 20. A particulate glass batch precursor composition, i.e. unreacted batch materials, is provided by the delivery system 22 into mixing chamber 20 and mixed with the exhaust stream. Although not required, the delivery system 22 is preferably a dilute phase pneumatic transport-type delivery system wherein the particulate glass batch precursor materials are injected into the mixing chamber 20 along with dilution air to enhance mixing and promote additional cooling of the exhaust stream. In one particular non-limiting embodiment of the present invention, the particulate glass batch precursor material and the dilution air are preferably injected into the mixing chamber 20 at a temperature of no greater than about 150° F. (about 66° C.), more preferably at a temperature no greater than about 95° F. (about 35° C.) and most preferably at a temperature that ranges from about 65° F. to about 95° F. (about 18° C. to about 35° C.) to effect the desired cooling of the exhaust stream. Although not preferred, other types of material delivery systems that are well known in the art, such as mechanical injectors or mechanical screw feeders, can be used in accordance with the present invention.

The injection of a particulate glass batch precursor composition into the mixing chamber 20 is preferred in the present invention over the use of pelletized or otherwise agglomerated materials since particulate materials have higher surface area and are typically more reactive with the volatiles in the exhaust stream. Additionally, particulate materials can be more homogeneously mixed with the exhaust stream and require less processing (i.e. reduce system complexity) than pelletized materials. Although not required, in one particular non-limiting embodiment in the present invention, preferably, at least about 90 percent and more preferably at least about 95 percent of the particulate glass batch precursor composition has an average particle size less than 325 mesh (about 44.5 micrometer).

The particulate glass batch precursor composition injected into the mixing chamber 20 comprises one or more of the particulate glass batch materials required to produce the desired glass composition. Preferably, at least one of the glass batch materials is also a reagent material, i.e. it will react with at least one of the volatile components in the exhaust stream. As used herein the phrase "reactive with at least one of the volatile components of the exhaust stream" means that the volatile component(s) in the exhaust stream adsorb on, condense on or chemically react with the reagent material to form a contaminate laden-particulate material. Typical glass batch materials include minerals, clays, sand and cullet (e.g. crushed or ground glass). Non-limiting examples of such materials are found in Loewenstein (3rd. Ed, 1993) at pages 36-44, which are hereby incorporated by reference. Although not required, in one non-limiting embodiment of the present invention, the at least one reagent material comprises preferably at least about 10 percent by weight, more preferably at least about 20 percent by weight, and most preferably at least about 25 percent by weight of the particulate glass batch precursor composition.

The actual materials in the particulate glass batch precursor composition will depend on the type of glass to be produced, the amount and type of volatile components in the exhaust stream and the reactivity of the reagent material. For example, if the desired final glass composition is an E-glass composition, the particulate glass batch precursor composition can comprise particulate glass batch materials that contain or can be decomposed or otherwise formed into silicon oxide, aluminum oxide, boron oxide, magnesium oxide, calcium oxide, sodium oxide, potassium oxide, iron oxide and fluorine. It will be appreciated by one skilled in the art that a range of E-glass compositions exist, including compositions that are free of boron and/or fluorine, and that the above composition is presented for clarity and not meant to be in any way limiting in the present invention.

Although not limiting in the present invention, preferably the particulate glass batch precursor composition will be deficient in the at least one of the one or more volatile components of the exhaust stream with which the at least one reagent material is reactive. As used herein the term "deficient" means that the particulate glass batch precursor composition contains less than a desired amount of the volatile component(s) in the exhaust stream with which the reagent material is reactive and would typically be included in a glass batch composition. For example, if the one or more volatile components of the exhaust stream includes boron and fluorine and the reagent material is reactive with fluorine but not boron, preferably the particulate glass batch precursor composition will be deficient in glass batch materials that contain fluorine but will have sufficient glass batch materials to provide the required amount of boron in the final glass batch composition. Similarly, if the one or more volatile components of the exhaust stream includes boron and fluorine and the reagent material is reactive with both boron and fluorine, preferably the particulate glass batch precursor composition will be deficient in glass batch materials that contain fluorine and boron. By combining a reagent material and a particulate glass batch precursor composition in the mixing chamber, wherein the batch precursor composition is deficient in at least one of the volatile components with which the reagent material is reactive, and reacting at least a portion of the reagent material with at least a portion of the volatile components in the exhaust stream, a glass batch composition having the desired final batch composition can be formed in-situ while the amount of the one or more volatile components in the exhaust stream is simultaneously reduced.

Non-limiting examples of typical particulate glass batch materials that are also reagent materials for fluorine, boron and/or sulfur include: alkali earth compounds, alkali metal compounds, aluminum compounds, silicon compounds and mixtures thereof. Non-limiting examples of alkali earth compounds include calcium-containing compounds, magnesium-containing compounds and mixtures thereof. Non-limiting examples of calcium-containing compounds include calcium carbonate, calcium oxide, calcium hydroxide and mixtures thereof. Non-limiting examples of alkali metal compounds include sodium-containing compounds, potassium-containing compounds and mixtures thereof. Non-limiting examples of sodium-containing compounds include sodium carbonate, sodium hydroxide and mixtures thereof.

It will be recognized by one skilled in the art that the amount of the precursor composition injected into the mixing chamber 20 will depend on many factors, such as the production rate of the glass melting furnace, the velocity and flow rate of the exhaust stream, the amounts and types of volatile components in the exhaust stream, the amount of reagent materials in the particulate glass batch precursor composition and the reactivity of the reagent material. Although not limiting in the present invention, in one embodiment the particulate glass batch precursor composition injected into the mixing chamber 20 is preferably at least five times in excess of a stoichiometric molar amount necessary to completely react the reagent material with the desired volatile component to be removed from the exhaust gas stream, more preferably at least 10 times in excess of this stoichiometric molar amount, and most preferably at least 20 times in excess of this stoichiometric molar amount. As used herein the term "stoichiometric molar amount" means the number of moles of the reagent material required to react with the number of moles of the desired volatile components in the exhaust stream. For example, if calcium carbonate ($CaCO_3$) is used as the reagent material and the volatile component with which it is to be reacted is fluorine in the form of hydrofluoric acid (HF), the stoichiometric molar amount of calcium carbonate needed to completely react with the hydrofluoric acid is given by the following equation:

$$1CaCO_3 + 2HF \rightarrow 1CaF_2 + 1CO_2 + 1H_2O \qquad \text{Eq. 1}$$

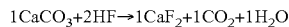

wherein 1 mole of calcium carbonate is required to react with 2 moles of hydrofluoric acid. Therefore, at least 10 times the stoichiometric molar amount of calcium carbonate would require at least 10 moles of calcium carbonate for every 2 moles of hydrofluoric acid. Such calculations are well known to those skilled in the art and further discussion is therefore not believed to be necessary in view of the present disclosure. Although not meant to be bound by any particular theory, by employing an amount of reagent material in excess of the stoichiometric molar amount needed, as described above, it is believed that a sufficient amount of reagent material will be present to achieve the desired reduction in volatile component(s) in the exhaust stream. Additionally, by using excess reagent material, it is believed that the glass batch composition being continuously formed in the mixing chamber will have a consistent composition.

It will be recognized by one skilled in the art that there is no practical upper limit to the excess stoichiometric molar amount of reagent material that can be injected into the mixing chamber 20 other than that which is imposed by the production rate of the glass melting furnace and the requirements of the final glass batch composition.

Referring back to FIG. 1, the exhaust stream having a reduced amount of the one or more volatile components and the glass batch composition formed in the mixing chamber 20 are extracted from the mixing chamber 20 through a second conduit 24 and introduced into a filtering apparatus 26. Conduit 24 can provide for additional mixing, reacting and cooling of the exhaust gas prior to introduction into the filtering apparatus 26. Although not required, if desired, additional dilution air can be added to the exhaust stream and glass batch material as it passes through conduit 24 for added cooling. It will be recognized by one skilled in the art that the amount of additional cooling desired in conduit 24 will depend, in part, on the volatile component(s) still remaining in the exhaust stream. For example, if the exhaust stream contains additional volatile boron compounds, e.g. $H_3BO_3$, it is desirable for the exhaust stream to be cooled to a temperature of about 150° F. (about 66° C.) or less in conduit 24 to promote the sublimation of particulate $HBO_2$ from the exhaust stream.

Although not limiting in the present invention, in one embodiment the temperature of the exhaust stream and the glass batch material introduced into the filtering apparatus 26 is preferably no greater than about 135° C. (about 275° F.) to permit the use of a low cost filtering apparatus, such as polyester filter bags. More preferably, the temperature ranges from about 65° C. to about 121° C. (about 150° F. to 250° F.). However, the temperature of the exhaust stream and the batch material can be higher if the filtering apparatus permits higher temperature operation.

In another, non-limiting embodiment of the present invention, no dilution air is intentionally added to the exhaust stream and batch material as they pass through the second conduit 24 and the temperature of the exhaust stream and the glass batch upon introduction into the filtering apparatus 26 ranges from about 104° C. (about 220° F.) to about 121° C. (about 250° F.). By eliminating the addition of dilution air into the conduit 24 in this embodiment of the present invention, the size of the filtering apparatus 26 can be minimized, thereby reducing the overall systems cost.

The filtering apparatus 26 can be any type known in the art. Non-limiting examples of suitable filtering apparatus include: electrostatic filters, fiber glass filters and fabric bag filters. Although not limiting in the present invention, in one embodiment, the filtering apparatus is preferably a pulse-jet fabric bag filter, as is well known in the art. In another non-limiting embodiment of the present invention, the filtering apparatus is preferably a spun bond polyester pleated filter element with a polytetrafluoroethylene membrane (commercially available as BHA-Tex from BHA of Kansas City, Mo.).

Referring to FIG. 1, batch material is separated from the exhaust stream in filtering apparatus 26 and the exhaust stream, having a reduced amount of one or more volatile components, is vented through vent 28 to the atmosphere. In one embodiment of the present invention, the exhaust stream vented through vent 28 has an opacity of no greater than about 20 percent, more preferably no greater than about 5 percent, and most preferably has an opacity of 0 percent when vented to the atmosphere. The opacity of the vented exhaust stream will depend on the types of volatile to be removed as well as the efficiency of removal, as discussed earlier.

As shown in FIG. 1, the particulate glass batch composition separated from the exhaust stream by the filtering apparatus 26 is collected by a collecting chamber 30. Although not required, the collection chamber 30 can include a mixing device (not shown) to further homogenize the particulate glass batch composition. Glass batch composition is then transported to a desired location. For example and without limiting the present invention, the glass batch composition can be transported to and fed directly into the glass melting furnace 10 via a glass batch feeding system 32 interconnected with the collection chamber 30 and the one or more batch material inlets 14 of the glass melting furnace 10. As an alternative, the glass batch composition can be recycled to a storage area or be fed to a different glass melting furnace. It is further contemplated that, depending on the amount of glass batch composition delivered by the collection chamber 30, the batch feeding system 32 can fully supply the glass melting furnace 10 or can be combined with a second batch delivery system (not shown in FIG. 1) connected to the one or more batch material inlets 14 of melting furnace 10 to provide additional glass batch forming materials to the furnace 10 as required. When the particulate glass batch composition is fed directly into glass melting furnace 10, it temperature will depend in part on the operating temperature of the filtering apparatus 26. Although not limiting in the present invention, in one embodiment, the particulate glass batch composition is fed into glass melting furnace 10 at a temperature between about 150° F. to about 250° F. (about 65° C. to about 121° C.). It will be further appreciated by one skilled in the art that an additional benefit of the present invention is that the particulate glass batch composition is pre-heated prior to introduction into the glass melting furnace 10.

Although discussed above in terms of a single melting furnace, mixing chamber and filtering apparatus, it will be recognized by one skilled in the art that multiple glass melting furnaces, mixing chambers and/or filtering apparatus can be used in accordance with the present invention. For example, in one embodiment according to the present invention multiple glass melting furnaces can be connected via one or more conduits to a single mixing chamber. In another embodiment according to the present invention multiple glass melting furnaces can be connected via one or more conduits to one or more mixing chambers and a single filtering apparatus.

A method of contemporaneously forming a glass batch material and reducing an amount of one or more volatile components in an exhaust stream according to the present invention will now be described generally. An exhaust stream comprising one or more volatile components is introduced into a mixing chamber 20 at a temperature of no greater than about 1400° F. (about 760° C.). A particulate glass batch precursor composition comprising at least one reagent material that is reactive with at least one of the volatile components of the exhaust stream and air are then injected into the mixing chamber 20. Preferably, the particulate glass batch precursor composition is deficient in at least one of the volatile components of the exhaust stream with which the reagent material is reactive. At least a portion of the particulate glass batch precursor composition is then reacted with at least a portion of the volatile components of the exhaust stream in the mixing chamber 20 to form a glass batch composition and reduce the amount of the one or more volatile components in the exhaust stream.

It is also contemplated that the exhaust gas be exposed to only selected reagent materials to remove volatile components and the materials thereafter be added to other batch material. More specifically, in one embodiment of the invention, exhaust stream comprising one or more volatile components is introduced into a mixing chamber, and reacted with a reagent material also injected into the mixing chamber to form selected particulate glass batch material. This selected particulate glass batch material is then separated from the exhaust stream and mixed with additional particulate glass batch material to form a particulate glass batch composition for a desired glass composition while the exhaust stream having a reduced amount of the one or more volatile components is vented to the atmosphere. The glass batch composition is then transported to a location as discussed earlier. For example, if the particular volatile component in the exhaust stream to be removed is a boron, fluorine or sulfur-containing compound, the reagent material added to the mixing chamber could be a calcium or sodium-containing compound.

It will be appreciated by those skilled in the art that changes could be made to the embodiments described above without departing from the broad inventive concept thereof. It is understood, therefore, that this invention is not limited to the particular embodiments disclosed, but is intended to cover modifications which are within the spirit and scope of the invention, as defined by the appended claims.

Therefore, I claim:

1. A method of melting glass in a furnace, wherein a glass batch composition was transported to a glass melting furnace, the glass batch composition was melted in the furnace, and an exhaust stream comprising one or more volatile components was removed from the furnace, the improvements comprising:
    (a) mixing a stream comprising a predetermined composition of particulate glass batch materials with dilution air;
    (b) intermixing the mixed stream from step (a) with the exhaust stream, whereby at least a portion of said one or more volatile components is transferred from the exhaust stream to at least a portion of the particulate glass batch materials;
    (c) cooling the intermixed stream from step (b) by introducing additional dilution air;
    (d) separating the particulate glass batch materials from the intermixed stream from step (c); and
    (e) feeding the separated particulate glass batch composition into the glass melting furnace,
wherein the separated particulate glass batch composition constitutes a major portion of glass batch for the glass melting furnace.

2. The method according to claim 1, wherein the intermixing of step (b) is in a cyclone pattern.

3. The method according to claim 1, wherein the one or more volatile components of the exhaust stream comprises at least one of boron-containing compounds, fluorine-containing compounds, sulfur-containing compounds, and mixtures thereof.

4. The method according to claim 1, wherein the separated particulate glass batch composition constitutes substantially the sole source of glass batch for the glass melting furnace.

5. The method according to claim 1, wherein the glass melting furnace is a direct fired furnace utilizing oxygen as a combustion gas.

6. The method of claim 5, wherein the direct fired furnace also utilizes air as a combustion gas.

7. The method according to claim 1, wherein the mixed stream of step (a) is at a temperature of less than about 150° F. prior to the intermixing of step (b).

8. The method according to claim 1, wherein the predetermined composition of particulate glass batch materials mixed in step (a) constitutes a substantially complete glass batch composition deficient in only the at least one or more volatile components.

9. The method according to claim 1, wherein the particulate glass batch composition is an E-glass composition.

10. A method of melting glass in a furnace, wherein a glass batch composition was transported to a glass melting furnace, the glass batch composition was melted in the furnace, and an exhaust stream comprising one or more volatile components was removed from the furnace, the improvements comprising:
   (a) intermixing the exhaust stream, a predetermined composition of particulate lass batch materials, and a dilution air stream, whereby one or more volatile components from the exhaust stream are transferred to at least a portion of the particulate glass batch materials in a first zone;
   (b) transporting the intermixed stream to a second zone;
   (c) reducing the temperature of the intermixed stream in the second zone by combining the stream with additional dilution air;
   (d) separating the particulate glass batch materials from the exhaust and air portions of the intermixed stream; and
   (e) feeding the separated particulate glass batch composition into the glass melting furnace, wherein the separated particulate glass batch composition constitutes a major portion of glass batch for the glass melting furnace.

11. The method according to claim 10, wherein the exhaust stream, the stream comprising a mixture comprising a predetermined composition of particulate glass batch materials, and the dilution air stream are mixed in a cyclone.

12. The method of claim 10, wherein the separation step is performed at a temperature no greater than about 250° F.

13. The method according to claim 10, wherein the separated particulate glass batch composition constitutes substantially the sole source of glass batch for the glass melting furnace.

14. The method according to claim 10, wherein the glass melting furnace is a direct fired furnace utilizing oxygen as a combustion gas.

15. The method of claim 14, wherein the direct fired furnace also utilizes air as a combustion gas.

16. The method according to claim 10, wherein the mixture comprising a predetermined composition of particulate glass batch materials introduced in step (a) constitutes a complete glass batch composition deficient in only the at least one or more volatile components.

17. The method according to claim 10, wherein the temperature of the intermixed stream in the second zone is reduced to a temperature of 150° F. or less.

18. The method according to claim 10, wherein the one or more volatile components of the exhaust stream comprises at least one of boron-containing compounds, fluorine-containing compounds, sulfur-containing compounds, and mixtures thereof.

19. The method according to claim 10, wherein the particulate glass batch composition is an E-glass composition.

20. A method of melting glass in a furnace, wherein a glass batch composition was transported to a glass melting furnace, the glass batch composition was melted in the furnace, and an exhaust stream comprising one or more volatile components was removed from the furnace, the improvements comprising:
   (a) mixing a stream comprising particulate glass batch materials with dilution air, the particulate glass batch materials being deficient in one or more of the volatile components;
   (b) intermixing the mixed stream from step (a) with the exhaust stream, whereby at least a portion of the one or more volatile components is transferred from the exhaust stream to at least a portion of the particulate glass batch materials; and
   (c) supplying the particulate glass batch composition to the glass melting furnace, wherein the particulate glass batch composition constitutes a major portion of glass batch for the glass melting furnace.

21. The method according to claim 20, wherein the particulate glass batch composition is an E-glass composition.

22. The method according to claim 20, wherein the one or more volatile components of the exhaust stream comprises at least one of boron-containing compounds, fluorine-containing compounds, sulfur-containing compounds, and mixtures thereof.

23. The method according to claim 20, further comprising cooling the intermixed stream from step (b) by introducing additional dilution air.

24. A method of melting glass in a furnace, wherein a glass batch composition was transported to a glass melting furnace, the glass batch composition was melted in the furnace, and an exhaust stream comprising one or more volatile components was removed from the furnace, the improvements comprising:
   (a) mixing a stream comprising particulate glass batch materials with dilution air, the particulate glass batch materials having a consistent composition and being deficient in one or more of the volatile components;
   (b) intermixing the mixed stream from step (a) with the exhaust stream, whereby at least a portion of the one or more volatile components is transferred from the exhaust stream to at least a portion of the particulate glass batch materials; and
   (c) supplying the particulate glass batch composition to the glass melting furnace, wherein the separated particulate glass batch composition constitutes a major portion of glass batch for the glass melting furnace.

25. The method of claim 24, wherein the particulate glass batch composition is substantially the same as the glass batch composition.

26. The method of claim 25, wherein the glass batch composition is an E-glass composition.

27. The method according to claim 24, wherein the intermixing of step (b) is in a cyclone pattern.

28. The method according to claim 24, wherein the one or more volatile components of the exhaust stream comprises at least one of boron-containing compounds, fluorine-containing compounds, sulfur-containing compounds, and mixtures thereof.

29. The method according to claim 24, further comprising cooling the intermixed stream from step (b) by introducing additional dilution air.

30. The method according to claim 24, wherein the particulate glass batch composition constitutes substantially the sole source of glass batch for the glass melting furnace.

31. A method of melting glass in a furnace, wherein a glass batch composition was transported to a glass melting furnace, the glass batch composition was melted in the furnace, and an exhaust stream comprising one or more volatile components was removed from the furnace, the improvements comprising:
   (a) mixing the exhaust stream with a stream comprising dilution air and a particulate glass batch composition deficient in one or more of the volatile components, whereby a portion of said volatile components are transferred to at least a portion of said deficient particulate glass batch composition; and (b) supplying the particulate glass batch composition to the glass melting furnace, wherein the separated particulate glass batch composition constitutes a major portion of glass batch for the glass melting furnace.

32. The method according to claim 31, wherein the particulate lass batch composition constitutes substantially the sole source of glass batch for the glass melting furnace.

33. The method according to claim 31, wherein the mixing of step (a) is effected by a cyclone.

34. The method according to claim 31, wherein the mixing of step (a) comprises pneumatically conveying the particulate glass batch composition by means of the dilution air into contact with the exhaust stream.

35. The method according to claim 31, wherein the one or more volatile components of the exhaust stream comprises at least one of boron-containing compounds, fluorine-containing compounds, sulfur-containing compounds, and mixtures thereof.

36. The method according to claim 31, further comprising cooling the mixed stream from step (a).

37. The method according to claim 36, wherein cooling the mixed stream from step (a) comprises cooling the mixed stream to a temperature of 150° F. or less.

38. The method according to claim 36, wherein cooling the mixed stream from step (a) comprises cooling the mixed stream by introducing additional dilution air.

39. The method according to claim 31, wherein the glass melting furnace is a direct fired furnace utilizing oxygen as a combustion gas.

40. The method according to claim 39, wherein the direct fired furnace also utilizes air as a combustion gas.

41. The method according to claim 31, wherein the particulate glass batch composition is an E-glass composition.

42. A method of melting glass in a furnace, wherein a glass batch composition was transported to a glass melting furnace, the glass batch composition was melted in the furnace, and an exhaust stream comprising one or more volatile components was removed from the furnace, the improvements comprising:

(a) intermixing the exhaust stream, a predetermined composition of particulate glass batch materials, and a dilution air stream, whereby one or more volatile components from the exhaust stream are transferred to at least a portion of the particulate glass batch materials in a first zone;

(b) transporting the intermixed stream to a second zone;

(c) reducing the temperature of the intermixed stream in the second zone;

(d) separating the particulate glass batch materials from the exhaust and air portions of the intermixed stream; and (e) feeding the separated particulate glass batch composition into said glass melting furnace, wherein the predetermined composition of particulate glass batch materials introduced in step (a) constitutes a complete glass batch composition deficient in only one or more of the volatile components, and wherein the separated particulate glass batch constitutes a major portion of glass batch for the glass melting furnace.

43. The method according to claim 42, wherein the exhaust stream, the stream comprising a predetermined composition of particulate glass batch materials, and the dilution air stream are mixed in a cyclone.

44. The method according to claim 42, wherein the particulate glass batch composition constitutes substantially the sole source of glass batch for the glass melting furnace.

45. The method according to claim 42, wherein the glass melting furnace is a direct fired furnace utilizing oxygen as a combustion gas.

46. The method according to claim 45, wherein the direct fired furnace also utilizes air as a combustion gas.

47. The method according to claim 42, wherein the one or more volatile components of the exhaust stream comprises at least one of boron-containing compounds, fluorine-containing compounds, sulfur-containing compounds, and mixtures thereof.

48. The method according to claim 42, wherein the separation step is performed at a temperature no greater than about 250° F.

49. The method according to claim 42, wherein the particulate glass batch composition is an E-glass composition.

50. A method of melting glass in a furnace, wherein a glass batch composition was transported to a glass melting furnace, the glass batch composition was melted in the furnace, and an exhaust stream comprising one or more volatile components was removed from the furnace, the improvements comprising:

(a) intermixing the exhaust stream, a stream a predetermined composition of particulate glass batch materials, and a dilution air stream, whereby one or more volatile components from the exhaust stream are transferred to at least a portion of the particulate glass batch materials in a first zone;

(b) transporting the intermixed stream to a second zone;

(c) reducing the temperature of the intermixed stream in the second zone;

(d) separating the particulate glass batch materials from the exhaust and air portions of the intermixed stream; and (e) feeding the separated particulate glass batch composition into said glass melting furnace, wherein the particulate glass batch composition constitutes a major portion of glass batch for the glass melting furnace.

51. The method according to claim 50, wherein the exhaust stream, the stream comprising a predetermined composition of particulate glass batch materials, and the dilution air stream are mixed in a cyclone.

52. The method according to claim 50, wherein the glass melting furnace is a direct fired furnace utilizing oxygen as a combustion gas.

53. The method according to claim 52, wherein the direct fired furnace also utilizes air as a combustion gas.

54. The method according to claim 50, wherein the one or more volatile components of the exhaust stream comprises at least one of boron-containing compounds, fluorine-containing compounds, sulfur-containing compounds, and mixtures thereof.

55. The method according to claim 50, wherein the particulate glass batch composition is an E-glass composition.

* * * * *